US009479713B2

(12) United States Patent
Sonabend et al.

(10) Patent No.: US 9,479,713 B2
(45) Date of Patent: Oct. 25, 2016

(54) METHOD OF VIDEO ENHANCEMENT

(71) Applicant: Presencia en Medios SA de CV, Naucalpan (MX)

(72) Inventors: Roberto Sonabend, Bosques de Las Lomas (MX); Jose Luis Almeida, Bosques de Las Lomas (MX)

(*) Notice: Subject to any disclaimer, the term of this patent is extended or adjusted under 35 U.S.C. 154(b) by 0 days.

(21) Appl. No.: 14/867,422

(22) Filed: Sep. 28, 2015

(65) Prior Publication Data

US 2016/0021317 A1 Jan. 21, 2016

Related U.S. Application Data

(63) Continuation of application No. PCT/US2013/052236, filed on Jul. 26, 2013.

(51) Int. Cl.
*H04N 5/272* (2006.01)
*G06T 13/80* (2011.01)
*G06T 7/20* (2006.01)
*G11B 27/00* (2006.01)

(52) U.S. Cl.
CPC .............. *H04N 5/272* (2013.01); *G06T 7/20* (2013.01); *G06T 13/80* (2013.01); *G11B 27/00* (2013.01); *H04N 5/2723* (2013.01); *G06T 2207/30221* (2013.01)

(58) Field of Classification Search
CPC ...................................... H04N 5/272
USPC .......................... 348/578, 584–592
See application file for complete search history.

(56) References Cited

U.S. PATENT DOCUMENTS

| 5,264,933 | A  | * | 11/1993 | Rosser | ............... | H04N 5/2627 345/419 |
| 6,080,063 | A  | * | 6/2000 | Khosla | ............... | A63F 13/10 463/42 |
| 6,750,919 | B1 | * | 6/2004 | Rosser | ............... | H04N 5/272 348/584 |
| 9,094,615 | B2 | * | 7/2015 | Aman | ............... | G01S 3/7864 |

(Continued)

FOREIGN PATENT DOCUMENTS

WO  WO2015012857  1/2015

OTHER PUBLICATIONS

PCT Search Report & Written Opinion, May 7, 2014.

*Primary Examiner* — Paulos M Natnael
(74) *Attorney, Agent, or Firm* — r.r (princeton); Roy Rosser

(57) ABSTRACT

A system and method for enhancing a stream of video images in real-time. A primary stream of video images of a real event is obtained using broadcast video cameras. That primary stream also contains images of a display-object that change in appearance during the broadcast. At the same time, a stream of images of an agent-object is obtained. This may, for instance, be an animated computer-generated figure and may be stored on a local computer hard drive. The animated figure is choreographed and synchronized to be in time with the change of appearance of the display-object. By combining the primary and secondary image streams using match-moving technology, a composite stream is formed in which the agent-object appears to be causally linked to the display-object.

9 Claims, 3 Drawing Sheets

(56) References Cited

U.S. PATENT DOCUMENTS

| | | | |
|---|---|---|---|
| 2002/0080279 A1* | 6/2002 | Wang | A63F 13/12 348/584 |
| 2002/0087402 A1 | 7/2002 | Zustak et al. | |
| 2007/0197247 A1* | 8/2007 | Inselberg | G06Q 30/02 455/517 |
| 2009/0144785 A1* | 6/2009 | Walker | G11B 27/034 725/105 |
| 2009/0262137 A1* | 10/2009 | Walker | H04H 60/04 345/629 |
| 2012/0002014 A1* | 1/2012 | Walsh | G06T 19/006 348/47 |
| 2012/0094737 A1* | 4/2012 | Barclay | G07F 17/3213 463/20 |
| 2013/0019261 A1* | 1/2013 | Huber | G06Q 30/0269 725/32 |
| 2013/0091519 A1 | 4/2013 | McLauchlan et al. | |

* cited by examiner

METHOD OF VIDEO ENHANCEMENT

CROSS-REFERENCE TO RELATED APPLICATIONS

This is a U.S. continuation application of International Application PCT/US2013/052236, with an international filing date of Jul. 26, 2013, the U.S. prosecution of which International Application is hereby now abandoned, without prejudice to non-U.S. national stage applications that may result from this International Application. The contents of PCT/US2013/052236, with an international filing date of Jul. 26, 2013, are hereby incorporated by reference in their entirety.

BACKGROUND OF THE INVENTION

1. Field of the Invention

The invention relates to a method of enhancing a video presentation, and more particularly, to a method of synchronizing a virtual addition to a video sequence with a real event in real time.

2. Background Art

The invention relates to enhancing live broadcasts, particularly of sporting events. Virtual enhancements of such events has become commonplace in many sports and they add to both the advertising potential of the events and to the viewers understanding and enjoyment of the event. One particularly successful and popular virtual enhancement is the virtual yellow line that is now a staple of televised football games. Making a theoretical line visible allows even those not fully conversant with the rules of the game able to immediately grasp the objective of the current play.

To make such virtual enhancements even more interesting to the viewers, a method of making virtual characters appear to interact with events happening in the real world has been developed, i.e., virtual agents appear not merely to be in the image, but to be causally interacting with other, real objects in the event being televised.

3. Description of the Related Art

The relevant prior art involving virtual video insertion includes:

US Patent Application 20070197247 published by E. Inselberg on Aug. 23, 2007 entitled "Method and apparatus for interactive participation at a live entertainment event" that describes a method and apparatus that provide interactive participation at live entertainment events. Enjoyment for a plurality of participants is enhanced. Participants employ wireless interactive devices that present a promotional message and include user input and output interfaces. Participants are queried, and enter wagers via the user input interface. The wagers are transmitted to a central processor, stored as participant data, and processed into results. A visual display or the user output interface announces the results to the participants.

U.S. Pat. No. 5,264,933 issued to Rosser, et al. on Nov. 23, 1993 entitled "Television displays having selected inserted indicia" that describes an apparatus and method of altering video images to enable the addition of images, message, slogans or indicia in such a manner that they appear to be part of the original image as displayed. The application of the apparatus and method is particularly adapted to be used as advertising during sporting events or other events whereby an operator selects a portion of the video image display (16) such as a portion of a tennis court (12) recognizes the selected portion (17) and inserts a logo or advertising message (27) into that selected portion. The message is inserted into the selected portion of the court independent of how the scene is being panned or viewed by the television camera. The apparatus employs a pattern recognition algorithm such as the Burt Pyramid Algorithm to recognize the specific selected image portion and by means of the image processor (17, 20 and 27) substitute the logo into the first image (16) to provide a display which appears as if the inserted image was actually painted on or otherwise permanently positioned on the court. Thus the inserted images are seamlessly and realistically incorporated into the original even as the original scene is moved, panned, magnified, zoomed or otherwise altered in size or perspective. The resulting composite image appears to the television viewer to be absolutely real and present at the scene.

U.S. Pat. No. 6,750,919 issued to Rosser on Jun. 15, 2004 entitled "Event linked insertion of indicia into video" that describes a system and method for placing event related information into a video broadcasting so that the added information does not interfere with or obscure the primary action of interest in the broadcast. The disclosed information could be implemented by using instructions from an event information gathering system to trigger the display of one of an appropriate set of pre-rendered animations in the broadcast video via a well known live video insertion system (48). The disclosed invention envisages the animation sequence having at least two parts (FIG. 4), namely a core or base sequence (34) which is always used, and a mid or a variable sequence (56, 58, 60) which is changed according to the actual data that needs to be displayed. The live video insertion system data (48) and processing may be used to perform occlusion, and/or tracking to either make the event information display look as if it is part of the scene, or merely to occlude the display when event action would otherwise be obscured, or to turn off or reposition, or resize the display when event action otherwise be obscured.

Various implements are known in the art, but fail to address all of the problems solved by the invention described herein. One embodiment of this invention is illustrated in the accompanying drawings and will be described in more detail herein below.

BRIEF SUMMARY OF THE INVENTION

The present invention relates to a method of enhancing a video stream in real time.

In a preferred embodiment of the present invention, a stream of video images of a real scene that may have at least one display-object may be obtained using, for instance, conventional broadcast cameras.

At substantially the same time, a stream of images of an agent-object may be provided.

The agent-object may, for instance, be a computer generated figure or mascot. The stream of images of the agent-object may, for instance, be an animated sequence of images of that figure stored in, for instance, a computer hard drive.

In the parts of that stream of video images in which at least a portion of the real world display-object is visible, a change of appearance of that display-object may be combined with the animated sequence of the agent-object in such a way that to a viewer of the stream of composite images, the agent-object and the change in the display-object appear to be causally linked, i.e., the agent-object, i.e., the computer generated figure, appears to a viewer of the broadcast, to be physically interacting with the display-object.

Therefore, the present invention succeeds in conferring the following, and others not mentioned, desirable and useful benefits and objectives.

It is an object of the present invention to provide a video enhancement that may be implemented in substantially real time.

It is another object of the present invention to provide a means for advertisers to draw television viewer's attention to in-stadium advertising by means of animations that are virtually inserted into the television broadcast of an event.

Yet another object of the present invention is to provide entertainment for television viewers.

DETAILED DESCRIPTION OF THE INVENTION

Figure 1:
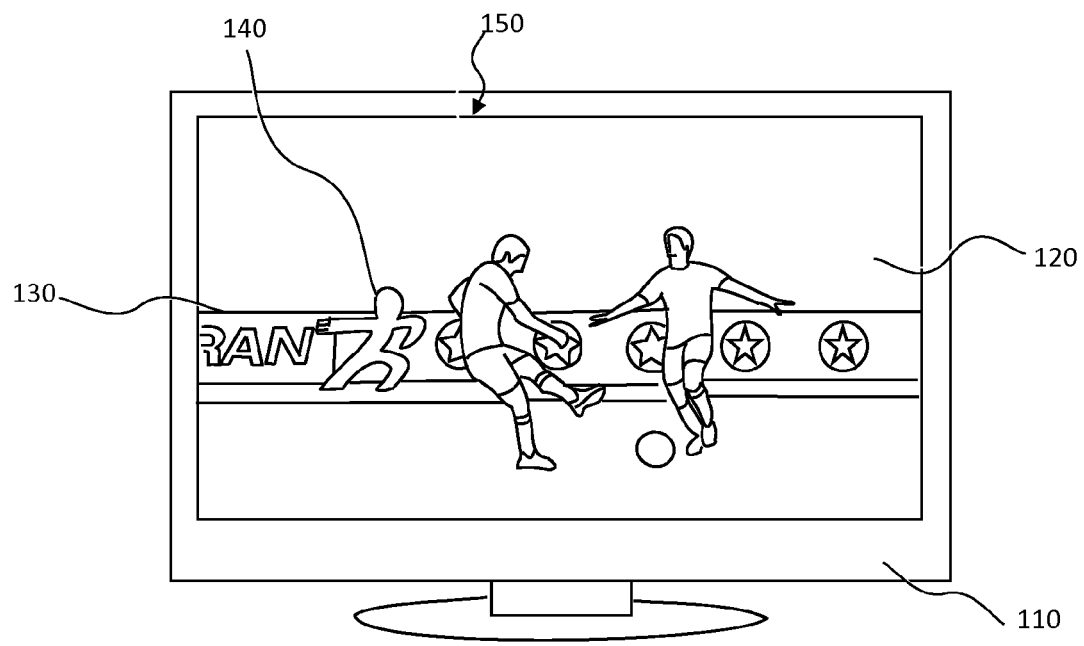
FIG. 1A shows the view as seen by the television audience of a sporting event in which the method of the present invention is being used.
FIG. 1B shows the view seen by the television audience of a sporting event in which the method of the present invention is being used, and is essentially the scene of FIG. 1A but seen at a later point in time.
Figure 1:
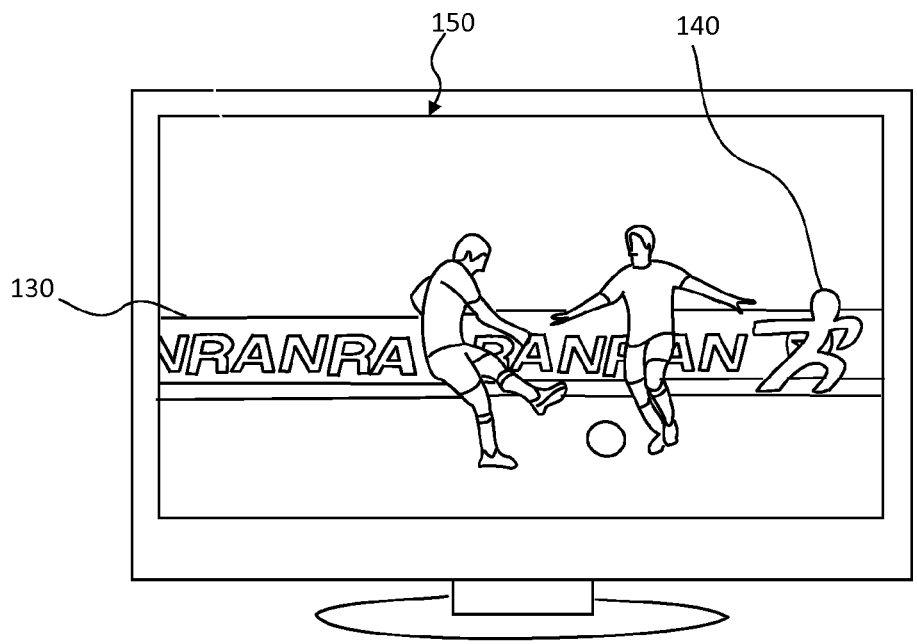

The preferred embodiments of the present invention will now be described with reference to the drawings. Identical elements in the various figures are identified with the same reference numerals.

Reference will be made in detail to various embodiments of the present invention. Such embodiments are provided by way of explanation of the present invention, which is not intended to be limited to merely the described embodiments, but may include all reasonable variations of them. In fact, those of ordinary skill in the art may appreciate upon reading the present specification and viewing the present drawings that various modifications and variations can be made to the described embodiments.

FIG. 1A shows the view seen by a television audience on a video display device 110 of a sporting event. The image seen on the video display device 110 has been modified using the method of the present invention for enhancing a video stream, as will be described below.

The picture on the video display device 110 may, for instance, be a stream of composite video images 150. The composite video images 150 may, for instance, be a combination of a stream of video images 120 of the event in which there is a display-object 130 and a stream of images in which there is an agent-object 140.

In FIG. 1A, the stream of video images 120 of the event may be of a soccer match.

The display-object 130 shown in this example may be a digital perimeter board. The display-object 130 may also, or instead, be any other type of adjustable display such as, but not limited to, a rotating perimeter board, a Jumbo Tron large-screen television display, general in-stadium signage or some combination thereof. In this example the agent-object 140 may be a computer generated cartoon character.

The agent-object 140 may, however, be any suitable object such as, but not limited to, a conventionally drawn animation, a computer generated animation, a Claymation animation, a video of a real person, object or animal, or some combination thereof.

FIG. 1b shows the view seen by the television audience of a sporting event in which the method of the present invention is being used. The scene shown in FIG. 1b is essentially the same scene as shown in FIG. 1a, but at a slightly later point in time. Being closely related in time, the two scenes may appear similar, but they may also have significant differences.

The display-object 130, i.e., in this instance the digital perimeter board, has changed in appearance between the images of FIG. 1a and FIG. 1b. The digital perimeter board may, for instance, be an LED powered video display, and the logo of a sponsor may be being displayed as moving horizontally along the digital perimeter board. The animation of the agent-object 140 may have been prerecorded to move across the television screen at the same speed the display object 130 appears to be moving. The composite video images 150 may, for instance, be combined using virtual insertion, or match-moving, techniques similar to those described in, for instance, U.S. Pat. No. 5,264,933. In this way, it may appear to the television audience that the agent-object 140 is pulling along the logo being displayed on the display object 130, i.e., that the real object and the virtual object are causally linked.

Figure 2:
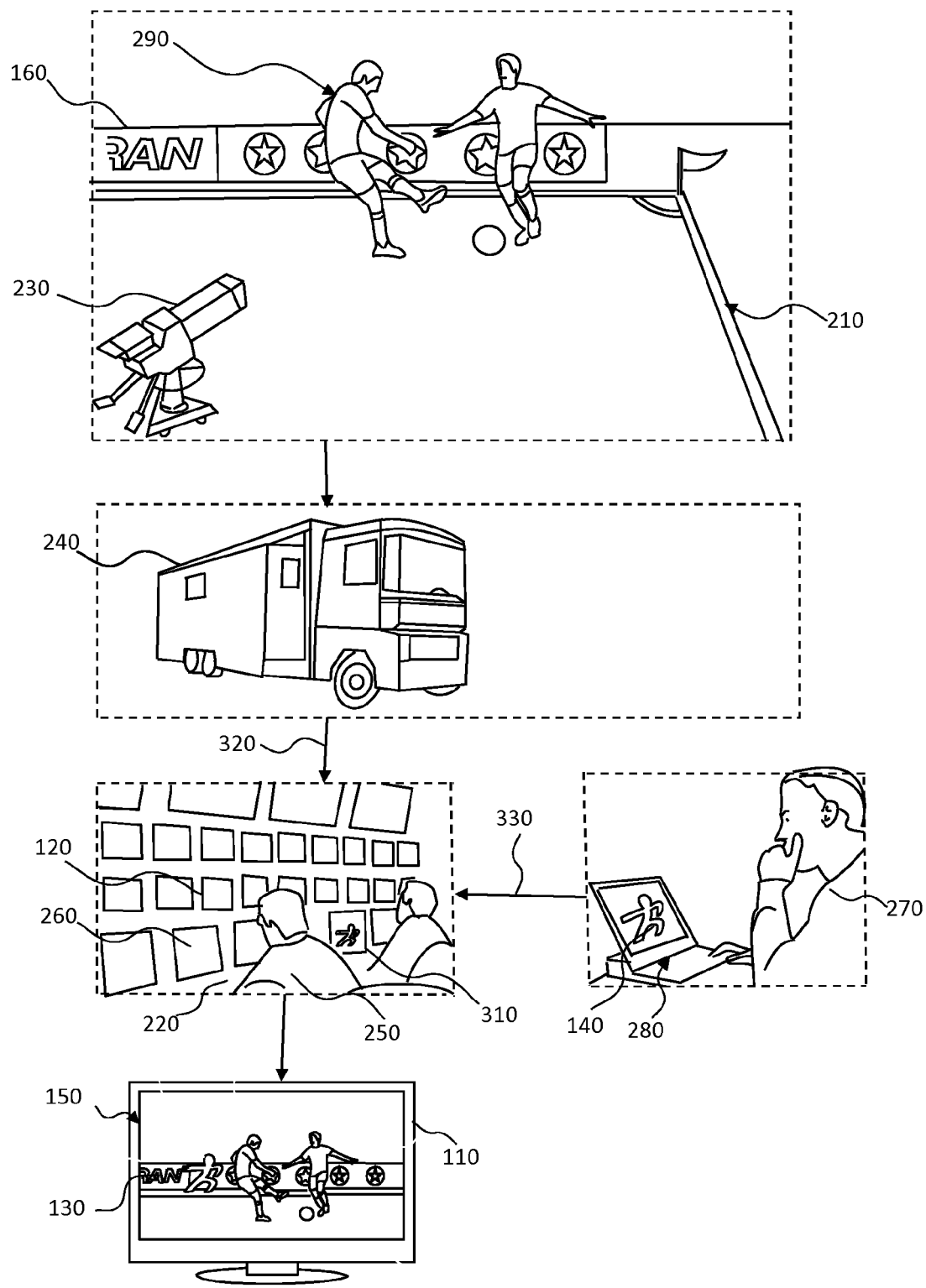
FIG. 2 shows a schematic overview of the system of the present invention.

FIG. 2 shows a schematic overview of the system of the present invention.

As shown in FIG. 2, a sporting event 290 may be taking place within a suitable venue such as, but not limited to, a stadium 210. The sporting event 290 may, for instance, be a contest such as, but not limited to, a soccer match, tennis match, a cricket match, a baseball game or a football game. The sporting event 290 may also be being televised using well-known broadcast video equipment such as, but not limited to, one or more broadcast video cameras 230 that may be color cameras, black and white cameras, high-definition cameras, 3D cameras, or some combination thereof.

As shown in FIG. 2, the stadium 210 may include in-stadium signage such as, but not limited to, a digital perimeter board 160, to display advertising that may be targeted at both the spectators present at the sporting event 290 and the television audience watching at a distance. The advertising, promotional or information message may also be displayed on any other suitable display within the venue such as, but not limited to, an adjustable or rotating display or a rotating perimeter board, a Jumbo Tron or some combination thereof.

The video of the sporting event 290 may be fed from the broadcast video cameras 230 to a nearby broadcast truck 240. A program director 250 may be in the broadcast truck 240 producing a program by combing the feeds from two or more broadcast video cameras 230 using well known broadcast equipment 260 such as, but not limited to, mixers, recorders and graphic inlay devices.

In a preferred embodiment of the present invention, there may also be an animation sequence of an agent-object 140. This animation sequence may, for instance, be created by one or more graphic artists 270 using computer graphics equipment 280. This computer graphics equipment 280 may be located at the broadcast truck 240, at a central broadcast studio or at a remote location. The animation sequence may be created ahead of time, it may be generated during the game or it may be produced using a combination of such techniques and technologies.

In a preferred embodiment, the animation created by the graphic artist 270 may be choreographed to match an event in the stadium 210. This choreography may be determined in advance of the event or while the event is being televised.

In alternative embodiments, the images may be captured as a live or prerecorded video stream, or as a combination of video and computer generated animation.

The program director 250 may mix the agent-object 140 animation sequence and the video feed being supplied by the broadcast video cameras 230 using virtual insertion, or match moving, techniques similar to those described in, for instance, U.S. Pat. No. 5,264,933. This technology may assure that the agent-object images are properly fused with the live video feed so that they appear with the desired, correct position, scale, orientation, and motion relative to said real scene, particularly the display-object 130.

In this way, in the example illustrated in FIGS. 1a and 1b, the composite video images 150, the agent-object 140 may appear to be pulling the logo being displayed on the display-object 130 around the stadium, i.e., that the real object and the virtual object are causally linked.

The program director 250 may control both the animation of the display-object 130 and the agent-object 140 from a common control system 220. Alternately, the animations may be synchronized by being tied to a predetermined event such as, but not limited to, a predetermined time during the game at which to start the sequence, or a timing sequence triggered by a camera moving to a particular point of view, or an object being recognized in the live video, or some combination thereof.

The animations may be triggered to start substantially simultaneously or there may be predetermined or random delays between their start, dependent on the effect that is being achieved.

Figure 3:
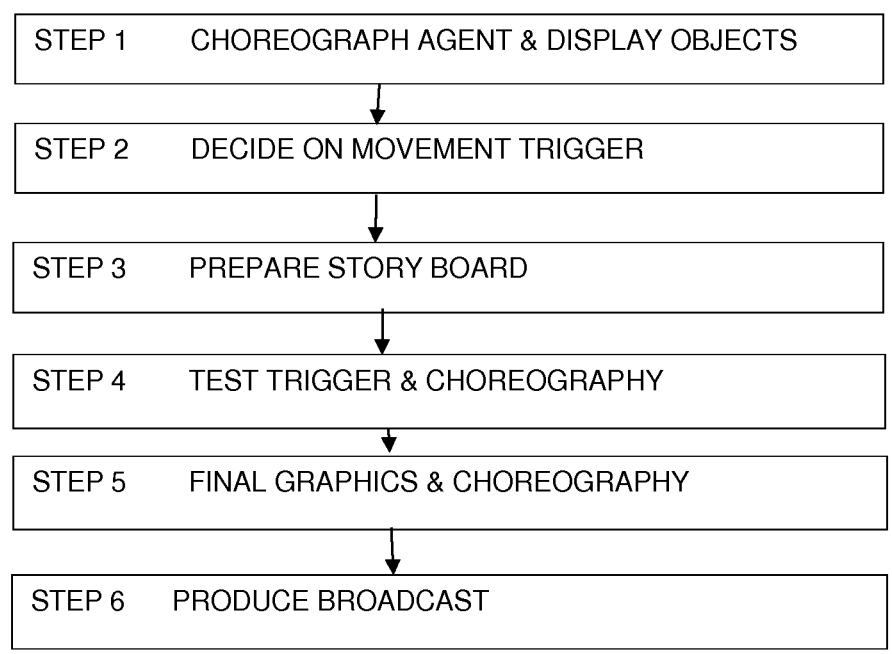
FIG. 3 shows a schematic flow diagram of the method of the present invention.

FIG. 3 shows an exemplary schematic flow diagram of the method of the present invention.

In Step 1, a desired video effect may be envisaged, i.e., the desired interaction between the agent-object and the display-object that may appear on the final composite or broadcast video. The interaction may need to be choreographed in some detail.

In Step 2, it may be necessary to decide on how the desired movement of the agent-object and of the display-object will be triggered. As discussed above, triggers may include events such as, but not limited to, a signal from the program director 250, or their agent, a predetermined time during the game at which to start the sequence, one or more timing sequences triggered by a camera moving to a particular point of view, or having a particular state of orientation and zoom, or an object being recognized in the live video, or some combination thereof.

In Step 3, it may be necessary to prepare preliminary story boards of the images intended to be used for displaying both the agent-object and the display-object.

In Step 4, it may be necessary to test the preliminary story boards to ascertain that they will function as desired with the selected images, triggering and synchronization. Any adjustments may then be made before preparing the final, detailed graphics.

In Step 5, it may be necessary to prepare the final graphics to be used for the display-object and for the agent-object if it is to be animated. If the agent-object is to be live, it may be necessary to prepare a detailed choreography, i.e., the position, timing and movement of the actor that will be filmed as the live or prerecorded agent-object. The movement of the agent object and the changes in the display object may, for instance, be choreographed so as the two objects appear to be physically influencing each other's motion.

In Step 6, may be possible to produce the live broadcast incorporating the desired video enhancement.

This may, for instance, be done with a system in which there is a display object 130. The display object 130 may, for instance, be located in a vicinity of a real, live event that is being televised. In a preferred embodiment, the display object may have at least one animated or moving element.

Another component that may be used to implement the method is at least one broadcast quality camera 230. The broadcast video camera 230 may be positioned and functionally enabled to provide a primary image source 320 comprising a stream of video images 120 of the real, live event that is being televised. The stream of video images 120 should preferably include at least a portion of said animated or moving element of the display object. This should preferably occur at least once during the televised broadcast.

Yet another component of a system to implement the method of the present invention may be a real-time, match-moving graphics engine 310. The real-time, match-moving graphics engine 310 may be functionally enabled to obtain the primary image source 320 and to combine them with one or more images, obtained from a secondary image source 330. The secondary image source 330 may be of an agent-object. The combined images, composite video images 150 may be one in which the agent-object appears to be causally interacting with the display object, i.e., the agent-object 140 may appear to causing the movement of the display object 130.

The display-object 130 may, for instance, be any suitable display capable of showing motion such as, but not limited to, a Jumbo Tron, a digital or rotating perimeter advertising board, animated in-stadium signage or some combination thereof.

The real-time, match-moving graphics engine 310 may be any suitably powerful and suitable programmed general purpose computer and the input, output and storage media associated with the computer.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of enhancing a video stream, comprising:
   providing a live video broadcast of an event occurring in stadium, said stadium comprising changeable in-stadium signage displaying a display-object, said in-stadium signage being visible to spectators present in said stadium and to a television audience viewing said live video broadcast;
   providing an agent-object comprising one or more images of a computer-generated cartoon character;
   combining said images of said agent object with said live video broadcast using match-making methodology such that the computer-generated character is visible only to said television audience and appears to said television audience to be present in said stadium;
   initiating a change of said display-object being displayed on said in-stadium signage; said display-object and said change being visible to said spectators present in said stadium and to said television audience; and
   choreographing a movement of said computer-generated cartoon character, visible only to said television audience, to coincide with said change of said display-object being displayed on said in-stadium signage such said computer generated cartoon character appears, to said television audience, to be real and to be causing said change of said display-object being displayed on said in-stadium signage.

2. The method of claim 1 wherein said changeable in-stadium signage is a rotating perimeter board.

3. The method of claim 1 wherein said changeable in-stadium signage is an LED equipped, digital perimeter board.

4. The method of claim 1 in which said event occurring in said stadium is a soccer match.

5. A system of enhancing a video stream, comprising:

a changeable in-stadium signage unit, located in a stadium in which a live video broadcast of an event is being televised, such that said changeable in-stadium signage unit's display is displaying a display-object visible to spectators present in said stadium;

at least one broadcast quality camera positioned and functionally enabled to provide a primary image source for said live video broad cast, said primary image source comprising a stream of video images of said event that include at least a portion of said changeable in-stadium signage unit's display, thereby also making said changeable, in-stadium signage visible to a television audience viewing said live video broadcast;

a real-time, match-moving graphics engine functionally enabled to obtain said stream of video images of said real, live event that is being televised and combine them with one or more images, obtained from a secondary image source, of an agent-object comprising a computer-generated cartoon character, to produce a composite stream of video images;

initiating a change of said display-object being displayed on said in-stadium signage; and choreographing a movement of said computer-generated cartoon character to coincide with said change of said display-object being displayed on said in-stadium signage such that to the television audience, said computer generated cartoon character appears to be real and to be causing said change of said display object being displayed on said in-stadium signage.

6. The system of claim 5 wherein said changeable in-stadium signage is a rotating perimeter board.

7. The system of claim 5 wherein said changeable in-stadium signage is an LED equipped, digital perimeter board.

8. The system of claim 5 in which said event occurring in said stadium is a soccer match.

9. The system of claim 5 where said real-time, match-moving graphics engine comprises a suitably powerful and suitably programmed general purpose computer and the associated input, output and storage media.

\* \* \* \* \*